United States Patent
Yang

(10) Patent No.: US 8,300,355 B2
(45) Date of Patent: Oct. 30, 2012

(54) FLUID DYNAMIC BEARING, SPINDLE MOTOR HAVING THE FLUID DYNAMIC BEARING, AND STORAGE APPARATUS HAVING THE SPINDLE MOTOR

(75) Inventor: Weihong Yang, Nagano (JP)

(73) Assignee: Minebea Co., Ltd., Nagano (JP)

( * ) Notice: Subject to any disclaimer, the term of this patent is extended or adjusted under 35 U.S.C. 154(b) by 246 days.

(21) Appl. No.: 12/861,180

(22) Filed: Aug. 23, 2010

(65) Prior Publication Data

US 2011/0051591 A1 Mar. 3, 2011

(30) Foreign Application Priority Data

Aug. 26, 2009 (JP) ................................. 2009-195061

(51) Int. Cl.
*G11B 17/08* (2006.01)
(52) U.S. Cl. ............... 360/99.08; 360/98.07; 360/271.3; 384/110; 384/123
(58) Field of Classification Search ............... 360/98.07, 360/99.04, 99.08, 271.3; 384/110, 114–123, 384/132
See application file for complete search history.

(56) References Cited

U.S. PATENT DOCUMENTS 5,370,463 A * 12/1994 Asada et al. ................... 384/113

FOREIGN PATENT DOCUMENTS

| JP | 2003-130042 A | 5/2003 |
| JP | 2003-156035 A | 5/2003 |
| JP | 2004-052987 A | 2/2004 |
| JP | 2006-275077 A | 10/2006 |
| JP | 2007-107555 A | 4/2007 |

* cited by examiner

*Primary Examiner* — Allen Heinz
(74) *Attorney, Agent, or Firm* — Carrier Blackman & Associates, P.C.; Joseph P. Carrier; William D. Blackman

(57) ABSTRACT

A fluid dynamic bearing includes an auxiliary bearing portion, a first radial bearing portion and a second radial bearing portion arranged along an axial direction of the fluid dynamic bearing, wherein the auxiliary groove formed in the auxiliary bearing portion is shallower in depth than the radial dynamic pressure groove formed in the first radial bearing portion, and wherein a gap size in the auxiliary bearing portion is set to be equal to or larger than a gap size in the radial bearing portions.

10 Claims, 9 Drawing Sheets

FLUID DYNAMIC BEARING, SPINDLE MOTOR HAVING THE FLUID DYNAMIC BEARING, AND STORAGE APPARATUS HAVING THE SPINDLE MOTOR

CROSS-REFERENCE TO THE RELATED APPLICATION(S)

The present disclosure relates to the subject matters contained in Japanese Patent Application No. 2009-195061 filed on Aug. 26, 2009, which are incorporated herein by reference in its entirety.

BACKGROUND

1. Field

The present invention relates to a fluid dynamic bearing for rotating recording disks, such as a magnetic disk and an optical disc, a spindle motor provided with the fluid dynamic bearing, and a storage apparatus provided with the spindle motor.

2. Description of the Related Art

The storage apparatus has the spindle motor that uses the fluid dynamic bearing to rotate a recording disk. The fluid dynamic bearing has a thrust bearing portion and a radial bearing portion, which are provided between a rotating member and a stationary member of the spindle motor so that a micro gap including a dynamic pressure generating groove is filled with a lubricating fluid. When the spindle motor rotates, a dynamic pressure generated in the thrust fluid dynamic bearing portion causes the rotating member to be floated with respect to the stationary member and to rotate in a non-contact state.

JP-B2-3955946 (JP-A-2004-052987) discloses a fluid dynamic bearing of a fully filled structure having only one interface. The fluid dynamic bearing has a pressure boosting portion provided at the interface side of a radial bearing portion. The pressure boosting portion induces a fluid dynamic pressure directed toward a thrust bearing portion. The fluid dynamic bearing also has a bypass passage with one end opening to a micro gap at the point where the pressure of the thrust bearing portion becomes minimum, and the other end opening to a micro gap placed at the boundary between the radial bearing portion and the pressure boosting portion.

The pressure boosting portion is configured by a spiral groove structure. The pressure boosting portion eliminates a negative pressure in an outer circumferential part of the thrust bearing portion. When the negative pressure is generated, air dissolved in a lubricating fluid is formed into air bubbles. The volume expansion of air bubbles due to the temperature rise or the like pushes up the air-liquid interface of the lubricating fluid and causes the lubricating fluid to leak out of the bearing. This affects the durability and the reliability of the spindle motor. When generated air bubbles touch the dynamic pressure generating groove, vibrations may occur. Also, the aggravation of non-repeatable run-out (NRRO) may occur. This affects the rotational precision of the spindle motor.

In a configuration described in JP-B2-3984449 (JP-A-2003-130042), a spiral dynamic pressure groove is formed on at least one of the inner circumferential surface of a sleeve and the outer circumferential surface of a shaft between the interface of a lubricating fluid and one of the radial bearing portions, which adjoins the interface of the lubricating fluid, to pump the lubricating fluid toward the thrust plate side during relative rotation and to maintain the internal pressure of the lubricating fluid, which is held in the gap located between the bearing portions, equal to or higher than atmospheric pressure.

By providing such a spiral dynamic pressure groove, a boost pressure is generated due to pumping by the spiral dynamic pressure groove, and the lubricating fluid is pumped toward the inside of the bearing device. Thus, a negative pressure is prevented from being generated in the gap located between radial bearing portions.

In a fluid dynamic bearing disclosed in JP-A-2003-156035, a plurality of regularly repeating dynamic pressure generating grooves are formed in the rotational direction of the bearing such that the grooves formed at upstream side of a lubricating fluid flow is higher in number than those formed at downstream side. The pumping action of the dynamic pressure grooves is enhanced by forming more dynamic pressure generating grooves at the upstream side than at the downstream side of the lubricating fluid flow wherein the turning point of each of dynamic pressure generating grooves is the boundary of upstream side and downstream side.

More particularly, the air-liquid interface at the upstream side of the lubricating fluid in a radial bearing portion is stabilized at the position lower than the dynamic pressure generating grooves during the rotation of rotor. When the rotor rotates, peaks and valleys of dynamic pressure generating grooves alternate in the air-liquid interface. Thus, narrow gaps and wide gaps are alternately created between the radial bearing surface and the outer circumferential surface of the rotational shaft of the rotor. Accordingly, the air-liquid interface is undulated like a pulsating-wave. Then, when the number of dynamic pressure generating grooves in the air-liquid interface is small, the number of waves is small, while the amplitudes of the waves are large. Consequently, the wave-motion of the air-liquid interface makes it easier to incorporate air bubbles in the interface.

Thus, by forming second grooves in an extension region adjacent to the dynamic pressure generating grooves, in which the air-liquid interface is located, and increasing the number of grooves in the extension region, the amplitude of the wave motion in the air-liquid interface is reduced and the capture of air bubbles at the air-liquid interface is prevented. The above facts are described in JP-A-2003-156035. That is, the second grooves are formed in a gap portion that is not filled with the lubricating fluid and provides the effect of pushing back the undulated air-liquid interface.

Spiral dynamic pressure grooves are formed consecutively at the bottom portion of lower herringbone dynamic pressure grooves. When the rotor rotates, the air-liquid interface of the lubricating fluid moves down at the position of the bottom portion and is undulated like a pulsating-wave and air bubbles are easily caught in the air-liquid interface. Thus, the spiral dynamic pressure grooves are provided a position adjacent to and lower than the interface. Consequently, the amplitude of the wave motion in the undulating air-liquid interface during rotation of the rotor is reduced by pushing back the interface toward the inner side of the bearing. Thus, air bubbles caught in the interface are reduced. Accordingly, the lubricating fluid is prevented from leaking out of the bearing.

In summary, the spiral dynamic pressure grooves described in JP-A-2003-156035 are located outside the lubricating fluid during rotation of the rotor and when the amplitude of the wave motion of the air-liquid interface is increased, so that the interface reaches the spiral dynamic pressure grooves, a pumping force of the spiral dynamic pressure grooves serves to push back the air-liquid interface.

In a configuration described in JP-A-2004-107555, lubricating fluid reservoir recesses are arranged at both ends of each of the herringbone dynamic pressure grooves formed at two places axially spaced apart on the inner circumferential surface of the sleeve of a fluid dynamic bearing. A spiral dynamic pressure groove is provided therein at the vicinity of the opening end of the bearing. In addition, annular grooves are provided between the spiral dynamic pressure groove and herringbone dynamic pressure groove and between the two herringbone dynamic pressure grooves, respectively. Consequently, the spiral dynamic pressure groove pumps the lubricating fluid to the inside of the bearing during rotation and prevents the leakage of the lubricating fluid.

JP-A-2006-275077 discloses a structure of a dynamic pressure fluid bearing device having two air-liquid interfaces arranged respectively at each side of the axial direction, in which spiral dynamic pressure grooves are formed in both ends of a bearing, respectively, to pump the lubricating fluid to the inside of the bearing during rotation. According to this reference, internal dimensions of the bearing are detailed to prevent the reduction in the dynamic pressure due to short of lubricating fluid caused by air bubbles captured when the spiral dynamic pressure grooves pump in the lubricating fluid.

A dynamic pressure is generated by the pumping action of the dynamic pressure grooves in the fluid dynamic bearing. Lubricating fluid is directed into the central part of each bearing portion and the fluid dynamic pressure is maximized at the central part of each bearing portion. On the other hand, the internal pressure of the lubricating fluid is decreased in the vicinity of both ends of the dynamic pressure groove. The decrease in the internal pressure at the vicinity of the groove end becomes more significant as the groove depth increases and the bearing gap decreases. In some cases, the internal pressure of the lubricating fluid may decrease until a level below the atmospheric pressure resulting in a negative pressure.

When the negative pressure is generated, air bubbles are easily generated in the lubricating fluid. Air bubbles may cause deterioration of the bearing performance, such as the generation of vibrations and the aggravation of NRRO (non-repeatable run-out). Thus, air bubbles may affect the rotational precision of a spindle motor. Further, when the spindle motor rotates, the temperature of the lubricating fluid rises. Thus, air bubbles that remain in the fluid dynamic bearing are thermally expanded at high temperature and may cause the lubricating fluid to leak out of the bearing device. Consequently, air bubbles may affect the durability and the reliability of the spindle motor. Therefore, air bubbles are undesirable in the lubricating fluid.

However, JP-B1-3955946 fails to describe the problem of the negative pressure generated in the vicinity of the end of the spiral dynamic pressure grooves formed in the pressure boosting portion. JP-B1-3984449 also fails to suggest about eliminating the generation of the negative pressure in the vicinity of the spiral dynamic pressure groove adjoining the lubricating fluid interface.

In the bearing described in JP-A-2003-156035, the spiral dynamic pressure groove is initially located outside the lubricating fluid, during rotation of the bearing. When the amplitude of the wave motion of the air-liquid interface is increased so that the interface reaches the spiral dynamic pressure grooves, the pumping force of the spiral dynamic pressure groove is generated to push back the air-liquid interface. However, the bearing described in JP-A-2003-156035 does not have the function of preventing the generation of the negative pressure in the lubricating fluid.

The bearing described in JP-A-2007-107555 is provided with annular grooves that are formed between the spiral dynamic pressure groove and each herringbone dynamic pressure groove and between both herringbone dynamic pressure grooves. The spiral dynamic pressure grooves pump the lubricating fluid toward the inside of the bearing and have advantages in preventing the leakage of the lubricating fluid. However, JP-A-2007-107555 does not describe the elimination of the negative pressure generated in the spiral dynamic pressure grooves.

JP-A-2006-275077 describes the structure provided with the dynamic pressure grooves that generate a dynamic pressure acting to the inside of the sleeve member during rotation of the bearing. However, no path for making the upper and lower interfaces communicate with each other and for circulating the lubricating fluid therebetween is provided in the structure. JP-A-2006-275077 discloses no means for eliminating the condition in which a negative pressure is easily generated in the vicinity of the ends of each spiral dynamic pressure groove.

SUMMARY

One of objects of the present invention is to provide a fluid dynamic bearing capable of suppressing the generation of negative pressure in the lubricating fluid at the vicinity of the end of a dynamic pressure groove, and to provide a spindle motor having such fluid dynamic bearing, and a storage apparatus having such spindle motor.

According to an aspect of the invention, there is provided a fluid dynamic bearing including: a stationary shaft that includes: a first end portion being relatively fixed to a base plate; a second end portion being provided with a flange portion; a first radial bearing surface being defined on an outer circumferential surface of the stationary shaft; a radial bearing member that includes: a second radial bearing surface that faces the first radial bearing surface to have a first gap therebetween; a first thrust bearing surface being defined on a first end portion of the radial bearing member; and a communication hole that connects a second gap with a third gap formed between a second end portion of the radial bearing member and one end surface of the flange portion, the radial bearing member being supported rotatably with respect to the stationary shaft; a thrust bearing member relatively fixed to the base plate and including a second thrust bearing surface that faces the first thrust bearing surface to have the second gap therebetween, the second gap communicating with the first gap; a lubricating fluid that fills continuously the first gap, the second gap, the third gap, and the communication hole; a radial bearing portion including a radial dynamic pressure groove formed on one of the first radial bearing surface and the second radial bearing surface; a thrust bearing portion including a thrust dynamic pressure groove formed on one of the first thrust bearing surface and the second thrust bearing surface; and an auxiliary bearing portion including an auxiliary groove for increasing pressure in the lubricating fluid from the flange portion to the radial bearing portion, the auxiliary groove being formed on one of the first radial bearing surface and the second radial bearing surface located between the flange portion and the radial bearing portion, wherein the auxiliary groove is shallower in depth than the radial dynamic pressure groove, and wherein a dimension of the first gap in the auxiliary bearing portion is equal to or larger than that of the first gap in the radial bearing portion.

BRIEF DESCRIPTION OF THE DRAWINGS

A general configuration that implements the various feature of the invention will be described with reference to the drawings. The drawings and the associated descriptions are provided to illustrate embodiments of the invention and not to limit the scope of the invention.

DETAILED DESCRIPTION OF THE EMBODIMENTS

Figure 1:
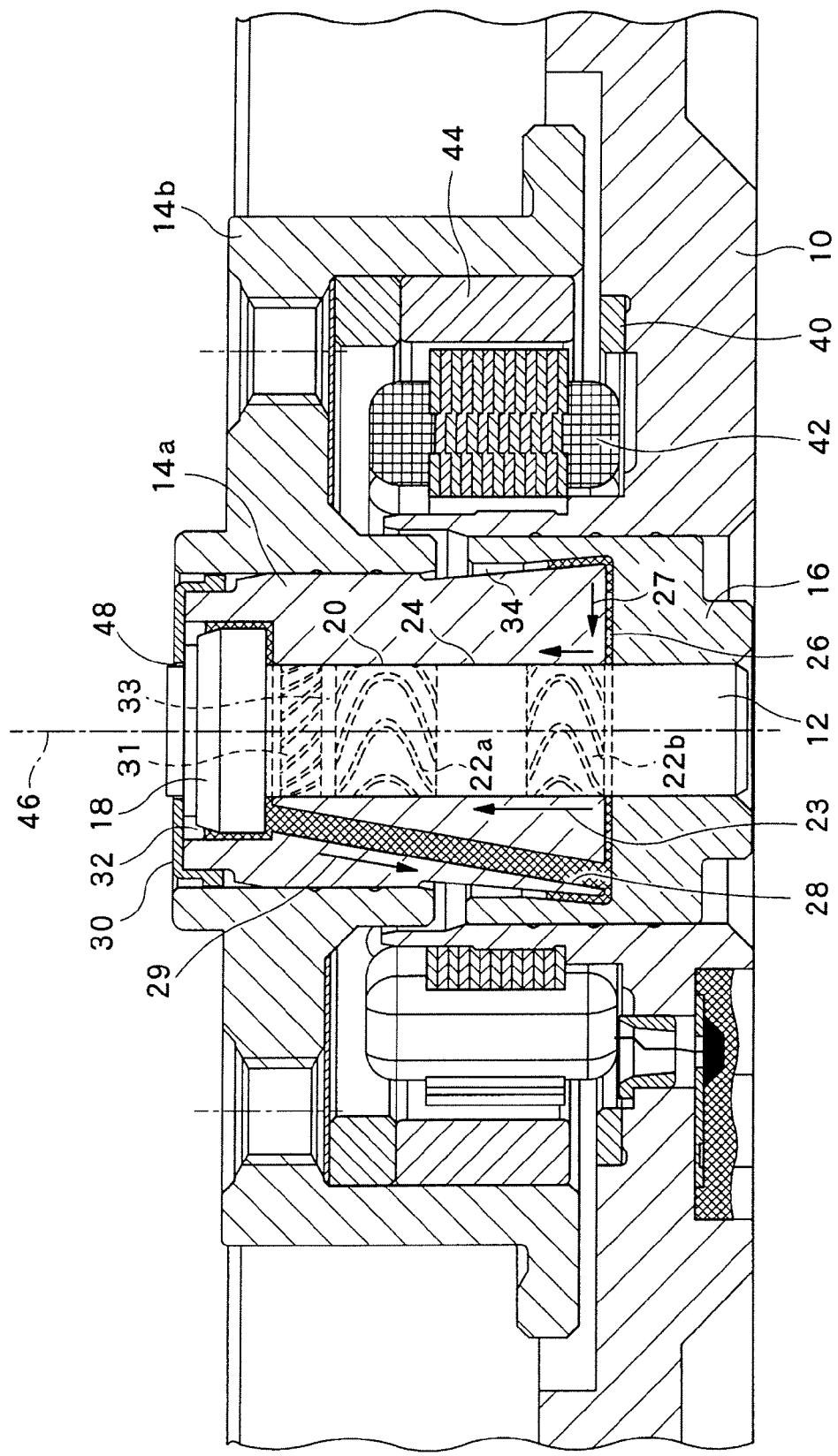
FIG. 1 is a longitudinal cross-sectional view illustrating a relevant part of each of a fluid dynamic bearing according to a first embodiment of the invention, a spindle motor having the fluid dynamic bearing, and a storage apparatus having the spindle motor.

Hereinafter, embodiments of the invention will be described with reference to the drawings. In the following description, the same or similar components will be denoted by the same reference numerals, and the duplicate description thereof will be omitted. The scope of the claimed invention should not be limited to the examples illustrated in the drawings and those described below.

The First Embodiment

A fluid dynamic bearing according to a first embodiment of the invention, a spindle motor having the fluid dynamic bearing, and a storage apparatus having the spindle motor are described hereinafter.

FIG. 1 illustrates a longitudinal cross-sectional structure of a relevant part of each of the fluid dynamic bearing according to the first embodiment and a spindle motor having the fluid dynamic bearing. The spindle motor is used in a storage apparatus for rotating a recording disk.

The spindle motor includes a base plate 10 having a cylindrical opening portion into which a thrust bearing member 16 corresponding to a bushing is fit.

The thrust bearing member 16 is substantially cup-shaped and includes a bottom portion, and an annular wall portion that extends upwardly and continuously from the bottom portion, as viewed in FIG. 1. A stationary shaft 12 is mounted in a support hole provided at the center of the bottom portion surrounded by the annular wall portion. A flange portion 18 formed annularly and integrally with the stationary shaft 12 is disposed at an upper end portion of the stationary shaft 12. A screw hole for connecting the spindle motor to a housing cover of a storage apparatus is opened in an end surface of a front end part of the flange portion 18, though the screw hole is not shown in the drawings.

A sleeve 14a is provided around the stationary shaft by being inserted rotatably with respect to the stationary shaft 12. A cup-shaped cover portion 30 having a central opening, into which a front end part of the flange portion 18 is inserted, is fixed onto an outer circumferential surface of the top portion of the sleeve 14a.

As viewed in FIG. 1, the top portion of the sleeve 14a has an increased inner diameter in order to receive the flange portion 18 of the stationary shaft 12 and a reduced outer diameter to fit the annular wall portion of the cover member 30.

The inner end surface of the top portion of the sleeve 14a faces the bottom surface of the flange portion 18 of the stationary shaft 12 through a micro gap (third gap). The bottom surface of the sleeve 14a faces the inner bottom surface of the thrust bearing member 16 through a micro gap (second gap).

Thus, the sleeve 14a is rotatably disposed in a space between the bottom surface of the flange portion 18 and the inner bottom surface of the thrust bearing member 16. A rotor hub 14b, on which a storage disk is loaded, is mounted on the upper outer circumferential surface of the sleeve 14a. According to the first embodiment, the sleeve 14a serves as a radial bearing member and the sleeve 14a and the rotor hub 14b together constitute a rotor portion. Alternatively, the sleeve 14a and the rotor hub 14b can be integrated to constitute the rotor portion as a one-piece member.

The bottom portion of the thrust bearing member 16 includes a support hole into which the bottom end portion of the stationary shaft 12 is fit. The bottom portion of the thrust bearing member 16 has a thickness and stiffness required to surely fix the stationary shaft 12 thereto. The annular wall of the thrust bearing member 16 is fixed by fitting the outer circumferential surface thereof into the inner circumferential surface of a cylindrical portion provided on the base plate 10. The inner circumferential surface of the thrust bearing member 16 surrounds the outer circumferential surface of the bottom portion of the sleeve 14a.

An adhesive can be applied between the stationary shaft 12 and the thrust bearing member 16, and also between the thrust bearing member 16 and the base plate 10. In this case, it is preferable to provide a groove on one of the surfaces of fitting portion, because the adhesive can be easily held in the fitting portion.

In the first embodiment, each of the stationary shaft 12, the sleeve 14a, the cover member 30, and the thrust bearing member 16 is configured by a single component. Thus, an individual fluid dynamic bearing can be manufactured by assembling these components. Then, a spindle motor can be obtained by attaching the base plate 10 and the rotor hub 14b after that.

Micro gaps communicating with the opening at both ends are formed between the stationary shaft 12 and the sleeve 14a and between the sleeve 14a and the thrust bearing member 16, respectively. The micro gaps are continuously filled with a lubricating fluid such as an ester oil.

A first capillary seal portion is formed at the upper opening end of the micro gap between the increased-diameter inner circumferential surface of the top portion of the sleeve 14a and the outer circumferential surface of the flange portion 18, which face each other, via a gap 32, whose width gradually increases toward the top thereof, as viewed in FIG. 1, in a counter-tapered manner. An upper air-liquid interface of the lubricating fluid is located in the first capillary seal portion.

The gap 32 extends in a direction substantially parallel to the axis of rotation 46 and is formed by two opposed surfaces, i.e., the outer circumferential surface of the flange portion 18 and the increased-diameter inner circumferential surface of the sleeve 14a, which are relatively inclined to the axis of rotation 46, preferably inwardly inclined thereto, as viewed in FIG. 1. Consequently, the lubricating fluid is pumped in the direction of the bearing gap 20, illustrated in the lower part of FIG. 1, by a centrifugal force created during the rotation of fluid dynamic bearing.

A labyrinth seal 48 is formed in the gap between the cover member 30 and the top end portion of the stationary shaft 12. The exchange of air and the consequent evaporation of the lubricating fluid are reduced due to the labyrinth seal 48. In addition, the lubricating fluid in the gap 32 can be more effectively prevented from being leaked out of the bearing.

A second capillary seal portion is formed at the lower opening end of the micro gap between the outer circumferential surface of the bottom portion of the sleeve 14a and the annular wall inner circumferential surface of the thrust bearing member 16 via a gap whose width gradually increases in a counter-tapered manner toward the top thereof, as viewed in FIG. 1. In addition, a lubricating fluid retention space 34 continuing the second capillary seal portion is formed. A lower air-liquid interface of the lubricating fluid is located in the second capillary seal portion.

The lubricating fluid retention space 34 is a region broader than the bearing gap 20 in the radial direction. This region is continuous with the tapered opening area formed between the outer circumferential surface of the sleeve 14a and the inner circumferential surface of the thrust bearing member 16 and extends substantially in the direction of the axis of rotation 46. The lubricating fluid retention space 34 serves as a fluid reservoir in addition to serving as a capillary seal. Thus, even when the lubricating fluid is lost by evaporation, the amount of lubricating fluid required for the whole bearing operational life can be assured.

Usually, the leakage of the lubricating fluid at the lower opening end can be prevented by the second capillary seal portion. If the lubricating fluid goes beyond the second capillary seal portion, the lubricating fluid is retained in the lubricant retention space 34. Accordingly, the leakage of the lubricating fluid is prevented. Additionally, a communication hole 28 that circulates the lubricating fluid in an oblique direction indicated by arrow 29, which is outwardly inclined to the axis of rotation 46 from top to bottom, is provided between the micro gap at the top side of the sleeve 14a, i.e., the gap between the bottom surface of the flange portion 18 and the sleeve 14a, and the micro gap at the bottom side of the sleeve 14a. Consequently, the lubricating fluid is smoothly circulated. Thus, even when the fluid dynamic bearing operates so that air bubbles are generated in the lubricating fluid, or even when air bubbles are thermally expanded, air bubbles are quickly eliminated to the outside from the gap 32 following the circulation path. Alternatively, the air bubbles are moved into the communication hole 28. Once in the communication hole 28, air bubbles are led to lower part by the centrifugal force. Then, air bubbles can be promptly eliminated from the lubricating fluid retention space 34 to the outside. Consequently, the bearing device can prevent efficiently the occurrence of lubricating fluid leakage, vibration and aggravation of NRRO originating from air bubbles generated by a negative pressure or air bubbles thermally expanded due to a temperature rise.

The lubricating fluid retention space 34 can absorb the variation in filled volume of the lubricating fluid by compensating the shortage or the excess of lubricating fluid. Both of the opposed surfaces of the sleeve 14a and the thrust bearing member 16, which form the tapered region of the lubricating fluid retention space 34, are inwardly inclined relative to the axis of rotation 46. Consequently, the lubricating fluid is pushed in the direction of the bearing gap 20 because a downward force component is generated by the centrifugal force during rotation of the bearing.

A first radial bearing portion 22a and a second radial bearing portion 22b spaced apart in the axial direction, as viewed in FIG. 1, are configured between the outer circumferential surface of the stationary shaft 12 and the inner circumferential surface of the sleeve 14a corresponding to the radial bearing member according to the first embodiment to generate a radial dynamic pressure.

More specifically, two radial bearing surfaces of the sleeve 14a, which are separated from each other in the axial direction by the second circumferential groove 24 disposed in the central portion of the inner circumferential surface of the sleeve 14a, surround the stationary shaft 12 and have appropriate dynamic pressure groove structures, while the bearing gap (first gap) 20 having a gap size (gap width) of few microns is formed. Consequently, the first radial bearing portion 22a and the second radial bearing portion 22b, which are separated from each other in the direction of the axis of rotation 46 of the stationary shaft 12 and face respectively the stationary shaft 12, are configured.

The radial dynamic pressure groove structure according to the first embodiment is formed on the radial bearing surface of the sleeve 14a. However, the radial dynamic pressure groove structure according to the first embodiment can be formed also on the radial bearing surface of the stationary shaft 12.

Figure 4:
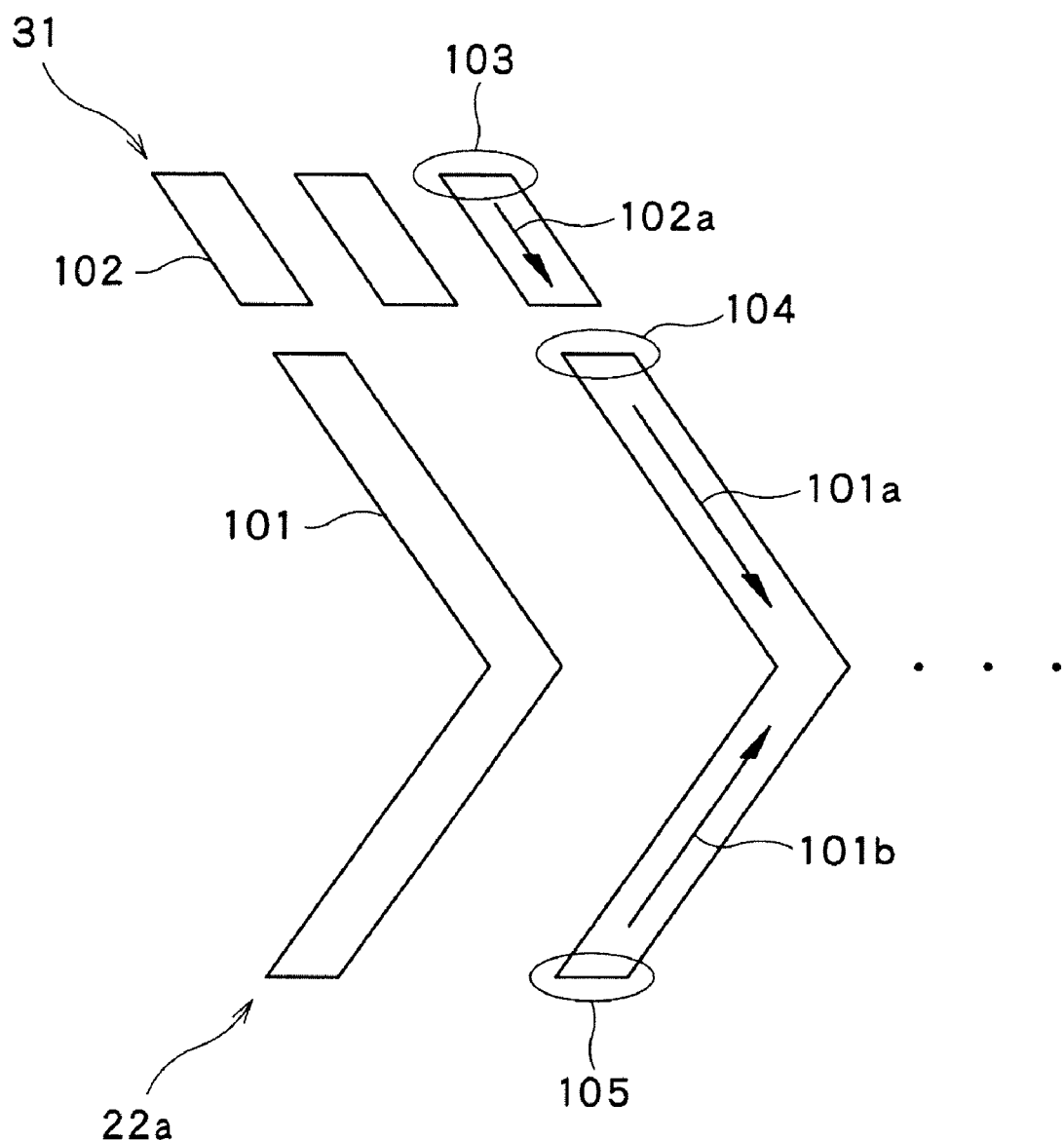
FIG. 4 is an explanatory view illustrating the flow of a lubricating fluid in a herringbone dynamic pressure groove and a spiral dynamic pressure groove in the fluid dynamic bearing according to the first embodiment of the invention.

Each of the dynamic pressure groove structures respectively formed on the first radial bearing portion 22a and the second radial bearing portion 22b includes a plurality of half-sinewave dynamic pressure grooves that direct the lubricating fluid in an upward direction along the axis of rotation 46 as illustrated in FIG. 1. Alternatively, the grooves may have a herringbone waveform, i.e., a V-shaped waveform as illustrated in FIG. 4.

A thrust bearing surface of the sleeve 14a extending in the radial direction and a corresponding thrust bearing surface of the thrust bearing member 16, which faces the thrust bearing surface of the sleeve 14, are formed at the lower side of the second radial bearing portion 22b, as viewed in FIG. 1. These thrust bearing surfaces constitute a thrust bearing portion 26 having an annular bearing surface perpendicular to the axis of rotation 46 of the stationary shaft 12.

In the thrust bearing portion 26, a spiral dynamic groove structure that pumps the lubricating fluid toward the center of the axis of rotation 46, as indicated by the arrow 27, to generate a dynamic pressure acting in the thrust direction (axial direction) is formed on one of the thrust bearing surfaces of the sleeve 14a and the thrust bearing member 16, or on both thrust bearing surfaces. The spiral dynamic pressure groove structure can be provided on a partial region of the thrust bearing surface of the sleeve 14a. However, in order to generate a dynamic pressure over the entire region of the thrust bearing surface, it is preferable to form the dynamic pressure structure that extends over the entire region of the thrust bearing surface, i.e., from the inner edge portion to the outer edge portion thereof.

Figure 2A:
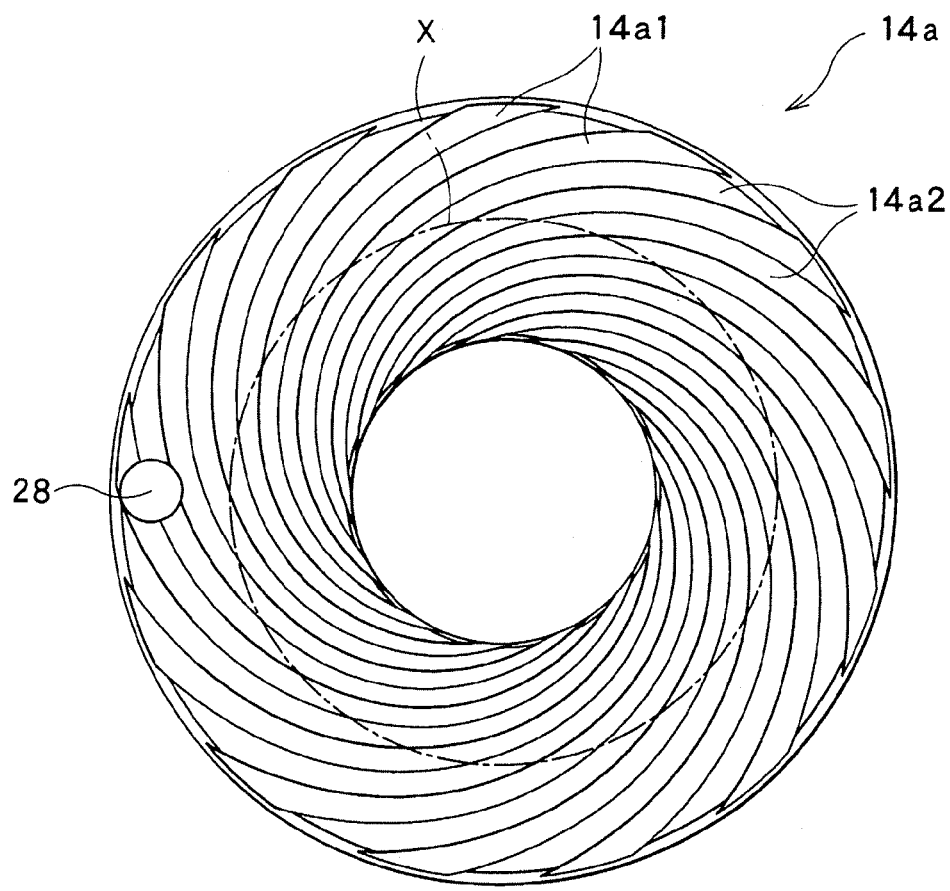
FIGS. 2A and 2B are plan views illustrating an example of a spiral dynamic pressure groove provided on a thrust bearing surface of the fluid dynamic bearing.
Figure 2B:
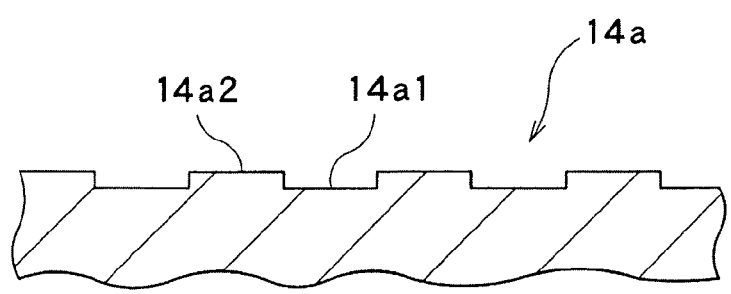

FIGS. 2A and 2B illustrate an example of the spiral dynamic pressure grooves provided on the thrust bearing surface on the bottom surface of the sleeve 14a. FIG. 2A illustrates a plan view of the thrust bearing surface. FIG. 2B illustrates a longitudinal cross-sectional view of a surface portion taken along a dot-dash-line X shown in FIG. 2A. As illustrated in FIGS. 2A and 2B, a plurality of grooves 14a1 and convex lands 14a2 are alternately and spirally provided. However, this shape of the thrust bearing surface is only illustrative. As long as the structure can generate a dynamic pressure, the thrust bearing surface can have other shapes.

According to this dynamic pressure groove structure, the fluid pressure continuously decreases from the inside to the outside in radial direction of the thrust bearing portion 2. Thus, even when air bubbles are generated in the lubricating fluid, air bubbles are led toward the radially outer side following the pressure gradient that decreases toward the radially outer side of the bearing. Air bubbles are then discharged from the thrust bearing portion 26 toward the lubricating fluid retention space 34.

The case where the thrust bearing portion 26 has the spiral dynamic pressure groove structure has been described in the first embodiment. However, the shape of the dynamic pressure groove structure is not limited to the spiral shape as long as the shape can generate dynamic pressure.

An electromagnetic drive apparatus corresponding to the motor device of the spindle motor includes a stator structure 42 disposed in a cylindrical portion of the base plate 10, and an annular permanent magnet 44 that is disposed on the inner circumferential surface of the rotor hub 14b and surrounds the stator structure 42 via the gap. When electric current is applied to the coil of the stator structure 42, the rotor portion including the rotor hub 14b and the sleeve 14a rotates. Consequently, a dynamic pressure is generated in the first radial bearing portion 22a, the second radial bearing portion 22b, and the thrust bearing portion 26. The rotor portion is floated and rotates while the rotor portion is supported in a non-contact state.

Regarding the force components in axial direction, the present spindle motor has only the thrust bearing portion 26 which generates a force for floating the rotor portion upwardly and does not have a bearing portion to generate a downward force.

Thus, it is necessary to provide a proper reaction force or an initial load on the rotor portion to balance the forces in axial direction. In the first embodiment, a ferromagnetic ring 40 which faces the permanent magnet 44 in axial direction and is magnetically attracted by the permanent magnet 44 is provided on the base plate 10. The magnetic attractive force thereof acts downwardly, i.e., in a direction opposite to the upward force generated by dynamic pressure in the thrust bearing portion 26. Thus, the forces acting in the axial direction can be balanced. Consequently, the rotor portion is prevented from being overfloated and rotates stably.

As described above, the space between the first capillary seal portion configured by the gap 32 and the first radial bearing portion 22a communicates with the space between the second capillary seal portion configured by the lubricating fluid retention space 34 and the second radial bearing portion 22b via the communication hole 28. The spiral dynamic pressure groove of the thrust bearing portion 26 pumps the lubricating fluid to the center of the sleeve 14a when the fluid dynamic bearing rotates. The dynamic pressure groove of the second radial bearing portion 22b pushes up the lubricating fluid upward, as indicated by arrow 23.

Consequently, a force for lowering the fluid level in the second capillary seal portion and raising the fluid level in the first capillary seal portion acts in the bearing and the leakage of the lubricating fluid may easily occur. Thus, the communication hole 28 is provided extending obliquely to redirect the flow going to the first capillary seal portion to a downward part illustrated in FIG. 1, as indicated by arrow 29, and prevent the leakage of the lubricating fluid.

However, in this structure, there is a possibility to occur a negative pressure in the top portion of the radial dynamic pressure groove formed on the first radial bearing portion 22a.

Figure 3:
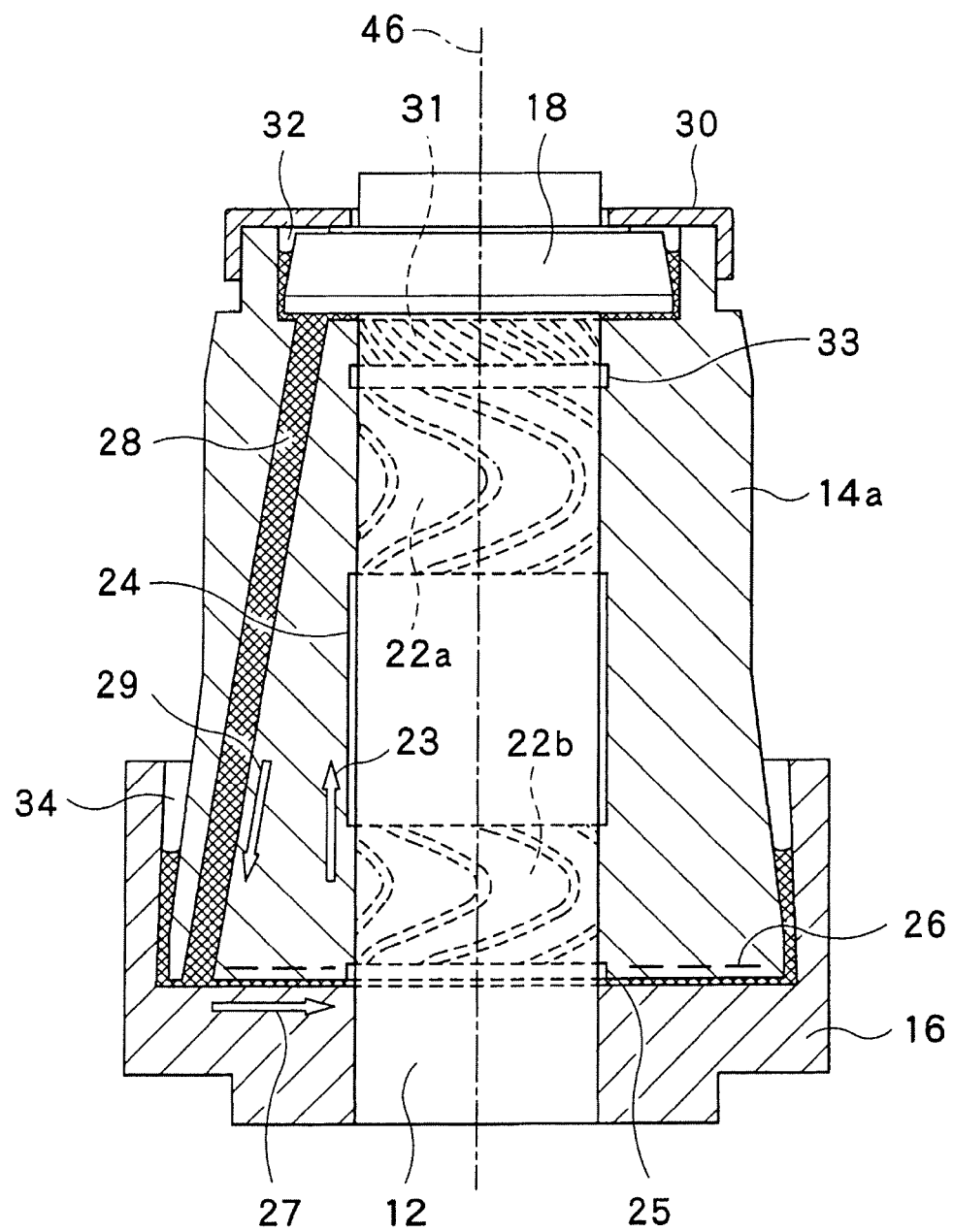
FIG. 3 is a longitudinal cross-sectional view illustrating a relevant part of the fluid dynamic bearing including an auxiliary bearing portion according to the first embodiment of the invention.

FIG. 3 enlargedly illustrates a peripheral portion of the first radial bearing portion 22a in the fluid dynamic bearing according to the first embodiment. An auxiliary bearing portion 31 including a spiral auxiliary dynamic pressure groove for raising the pressure of the lubricating fluid from the flange portion 18 to the first radial bearing portion 22a is provided between the first radial bearing portion 22a and the bottom surface of the flange portion 18 to eliminate the negative pressure in the first radial bearing portion 22a.

When the depth of the spiral dynamic pressure grooves in the auxiliary bearing portion 31 is set to be equal to that of the radial dynamic pressure grooves in the first radial bearing portion 22a, the internal pressure of the lubricating fluid held in the micro gaps existing between the bearing components and including the end portions of the dynamic pressure grooves can be increased by the spiral auxiliary grooves to be equal to or higher than atmospheric pressure. However, a negative pressure is generated in the vicinity of the top end portion of the spiral auxiliary groove in the auxiliary bearing portion 31.

Thus, according to the first embodiment, in order to suppress reduction in the pressure at the top end portion for the lubricating fluid in each spiral auxiliary groove as much as possible, the depth of each spiral auxiliary groove is set to be shallower than that of the radial dynamic pressure grooves provided on the adjacent first radial bearing portion 22a. The spiral auxiliary grooves are formed on one of the inner circumferential surface of the sleeve 14a and the outer circumferential surface of the stationary shaft 12 facing the sleeve 14.

The size of the gap in the auxiliary bearing portion 31 is larger than that of the gap in the first radial bearing portion 22a. Thus, the generation of a negative pressure in the top portion of the first radial bearing portion 22a is suppressed. In addition, the generation of a negative pressure in the top portion of each spiral auxiliary groove of the auxiliary bearing portion 31 is efficiently suppressed.

The inner diameters of the sleeve 14a at the auxiliary bearing portion 31 and at the first radial bearing portion 22a are set to be equal.

A first circumferential groove 33 is provided between the first radial bearing portion 22a and the auxiliary bearing portion 31 adjacent thereto. The depth of the first circumferential groove 33 is equal to or deeper than that of the radial dynamic pressure groove of the first radial bearing portion 22a. As described above, a second circumferential groove 24 is provided between the first radial bearing portion 22a and the second radial bearing portion 22b. The gap size enlarged by the first circumferential groove 33 and the second circumferential groove 24 is larger than the gap size in the adjacent upward and downward portion, as shown in FIG. 3. Because such a wider gap is provided between the narrow gaps, the pressure reduction in the vicinity of the groove ends in the narrow gaps is suppressed.

The top end portion of each spiral dynamic pressure groove of the auxiliary bearing portion 31, i.e., an end portion of each spiral auxiliary groove, which is located in the boundary with the top end surface of the sleeve 14a or with the flange portion 18 of the stationary shaft 12, as viewed in FIG. 3, communicates directly with the gap between the top surface of the sleeve 14a and the bottom surface of the flange portion 18.

Thus, preferably, chamfering is performed on the boundary of the top surface of the sleeve 14a and the auxiliary bearing portion. More particularly, in a case where spiral auxiliary grooves are formed on the sleeve 14a, the spiral auxiliary grooves extend until the top surface of the sleeve 14a. In a case where spiral auxiliary grooves are formed on the stationary shaft 12, the spiral auxiliary grooves are extended beyond the top surface of the sleeve 14a until a position close to the flange portion 18.

As illustrated in FIG. 4, in order to suppress the pressure reduction in the vicinity of the top end 103 of a spiral auxiliary groove 102 of the auxiliary bearing portion 31, the spiral auxiliary groove is connected directly to the gap between the top surface of the sleeve 14a and the bottom surface of the flange portion 18.

Similarly, in order to suppress the pressure reduction in the vicinity of the top end 104 of a half-sinewave or herringbone dynamic pressure groove 101 of the first radial bearing portion 22a, the end portion of the half-sinewave or herringbone dynamic pressure groove 101 is connected to the gap at the first circumferential groove 33. Consequently, only a small increment in pressure, which is to be provided by the spiral auxiliary grooves in the auxiliary bearing portion 31, is required to suppress the generation of negative pressure in the first radial bearing portion 22a. Thus, the axial length of the auxiliary bearing portion 31 can be minimized and the axial length of the entire fluid dynamic bearing can be reduced.

In order to cancel the negative pressure in the vicinity of the top end 104 of each radial dynamic pressure groove 101, the length, the depth and the gap size of the spiral auxiliary groove 102 can be modified and adjusted as needed for implementing the necessary increment in pressure.

In addition, in order to suppress pressure reduction in the vicinity of the bottom end 105 of each radial dynamic pressure groove of the first radial bearing portion 22a, the bottom portion of each radial dynamic pressure groove is connected to the gap at the second circumferential groove 24. Similarly for the second radial bearing portion 22b, the top end portion and the bottom end portion of each radial dynamic pressure groove are connected to the gap at the second circumferential groove 24 and to the gap at the third circumferential groove 25, respectively.

In order to avoid any impediment to circulation of the lubricating fluid, desirably, the pumping force due to the spiral auxiliary grooves of the auxiliary bearing portion 31 is set at a magnitude which does not change the original flow direction (indicated by arrows in FIG. 3) of the lubricating fluid in the bearing without the auxiliary bearing portion 31.

By providing the first circumferential groove 33 and connecting each radial dynamic pressure groove 101 of the first radial bearing portion 22a to the first circumferential groove 33, the pressure in the first circumferential groove 33 is uniformized. Consequently, the number of the necessary spiral auxiliary grooves 102 of the auxiliary bearing portion 31 can be reduced. Therefore, the required level of manufacturing accuracy for eliminating a positional deviation of each spiral auxiliary groove 102 along the circumferential direction becomes lower. Accordingly, the manufacturing cost of the bearing can be reduced.

The inner diameter of the auxiliary bearing portion 31 and the first radial bearing portion 22a in the sleeve 14a are set to be equal. Consequently, rotational torque due to the auxiliary bearing portion 31 can be minimized. In addition, as the inner diameters of the bearing portions are equal, the manufacturing of the sleeve 14a is facilitated and the cost of the bearing can be reduced.

Figure 5:
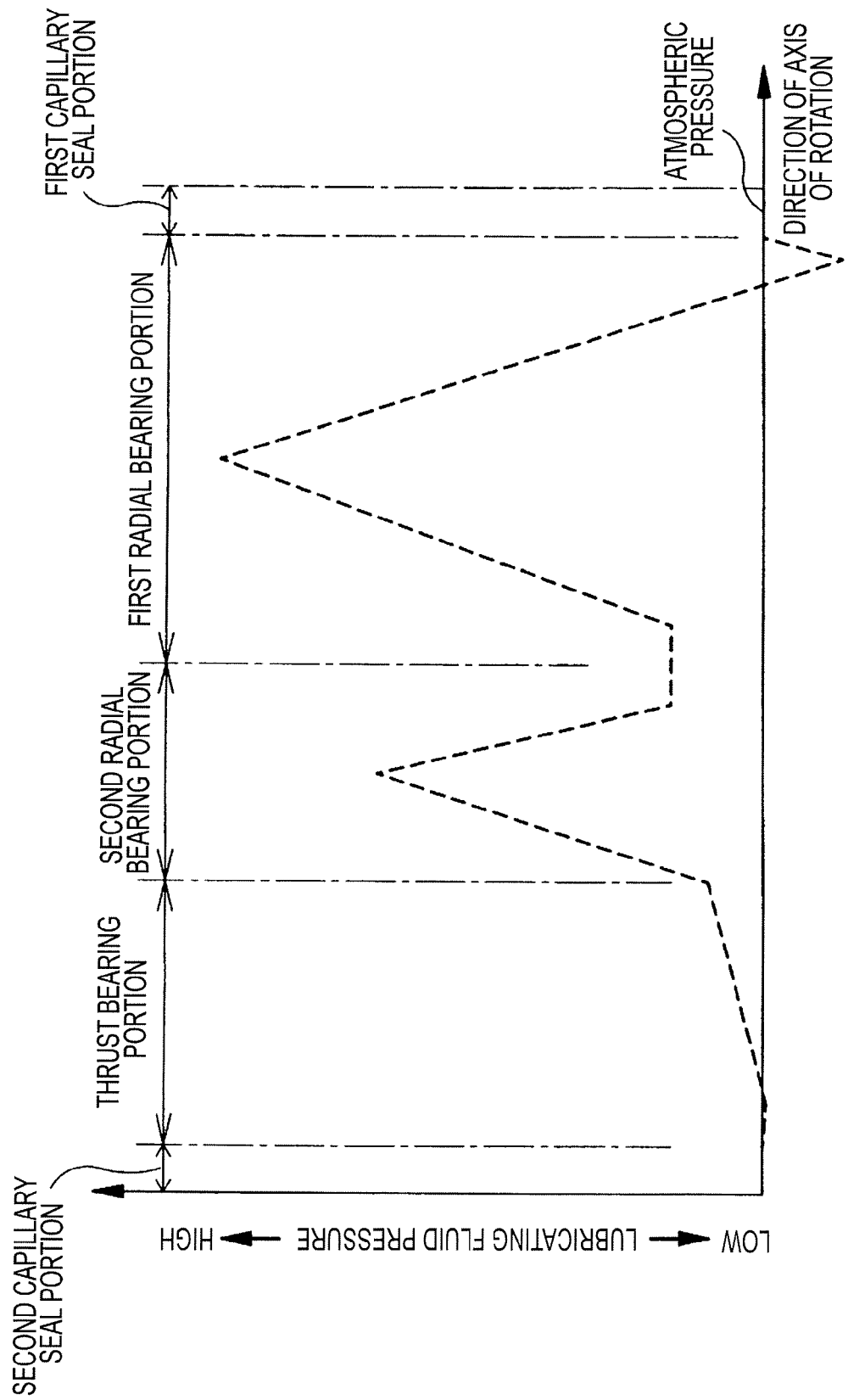
FIG. 5 is a graph illustrating the pressure distribution of a lubricating fluid in a fluid dynamic bearing according to a comparative example.

The dashed lines in FIG. 5 schematically illustrates the pressure distribution through a fluid dynamic bearing according to a comparative example with no auxiliary bearing portion.

According to FIG. 5, the second capillary seal portion configured by the lubricating fluid retention space 34 placed at a lower part of the bearing along the direction of the axis of rotation 46 is in an atmospheric pressure condition. The pressure in the lubricating fluid is gradually raised through the thrust bearing portion 26. The pressure is maximized nearly at the central portion of the second radial bearing portion 22b. The pressure is lowered and becomes substantially constant in the second circumferential groove portion 24 located between the second radial bearing portion 22b and the first radial bearing portion 22a. The pressure is maximized again at the central part of the first radial bearing portion 22a. The pressure has a minimum value lower than atmospheric pressure at the vicinity of the connection between the first radial bearing portion 22a and the first capillary seal portion. That is, a negative pressure is generated at the vicinity of the end of radial dynamic groove of the first radial bearing portion 22a. The pressure at the first capillary seal portion configured by the gap 32 becomes constant at atmospheric pressure, similarly to the second capillary seal portion.

Figure 6:
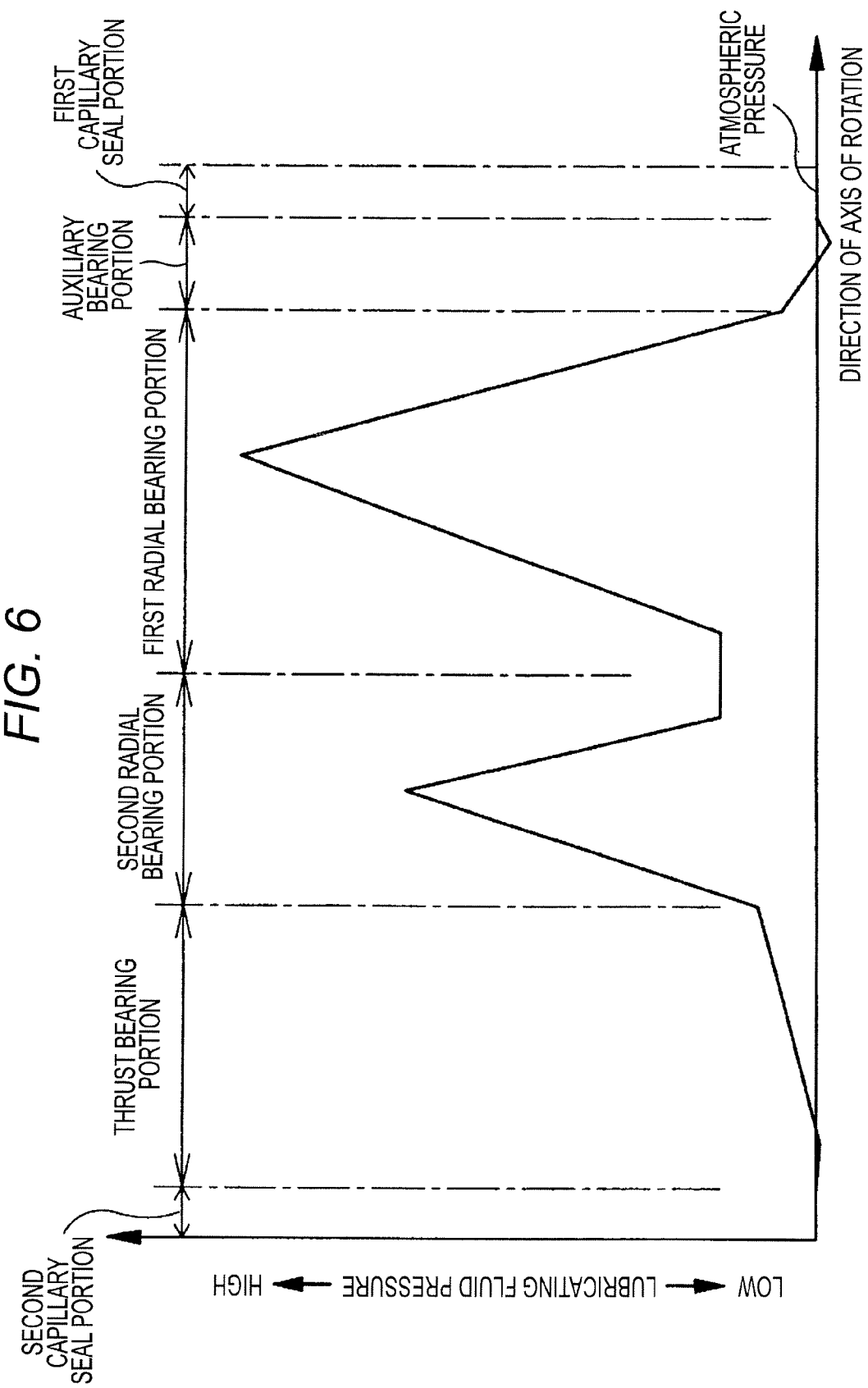
FIG. 6 is a graph illustrating the pressure distribution of a lubricating fluid in a fluid dynamic bearing according to the invention.

On the other hand, according to the first embodiment, the auxiliary bearing portion 31 is provided between the first radial bearing portion 22a and the first capillary seal portion. Consequently, the pressure distribution becomes as illustrated by solid lines in FIG. 6. The pressure distribution is substantially similar to FIG. 5 at the first and second capillary seal portions, the thrust bearing portion 26, the second radial bearing portion 22b, and the first radial bearing portion 22a.

However, because the auxiliary bearing portion 31 is provided, the generation of a negative pressure is prevented in the vicinity of the end of radial dynamic pressure groove of the first radial bearing portion 22a, which is close to the auxiliary bearing portion 31.

In addition, in the auxiliary bearing portion 31, the spiral auxiliary grooves shallower than the radial dynamic pressure grooves of the first radial bearing portion 22a are provided. The gap size in the auxiliary bearing portion 31 is set to be equal to or larger than the gap size in the radial bearing portion 22a. Thus, the gradient of pressure reduction becomes low. Accordingly, the generation of a negative pressure is suppressed in the vicinity of the end of spiral auxiliary groove close to the boundary between the auxiliary bearing portion 31 and the first capillary seal portion, so that the pressure is maintained substantially equal to the atmospheric pressure.

Thus, according to the first embodiment, the auxiliary bearing portion 31 reduces the occurrence of the negative pressure in the vicinity of the end of the radial dynamic pressure groove of the first radial bearing portion 22a. It is also found that the generation of the negative pressure is suppressed over the entire fluid dynamic bearing.

The Second Embodiment

Figure 7:
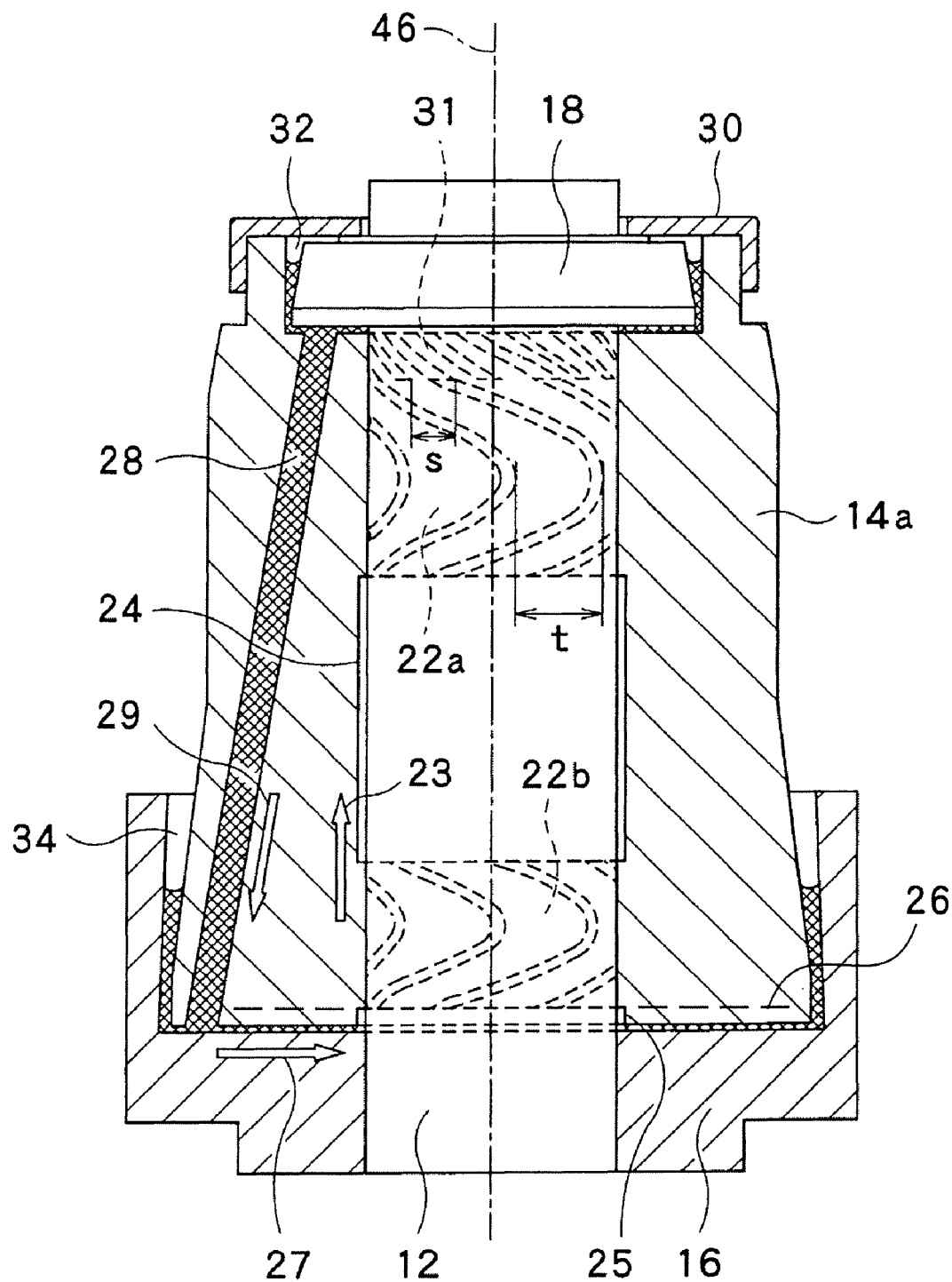
FIG. 7 is a longitudinal cross-sectional view illustrating a fluid dynamic bearing according to a second embodiment of the invention.

A fluid dynamic bearing according to the second embodiment of the invention, is described hereinafter. FIG. 7 illustrates a longitudinal cross-sectional structure of a relevant part according to the second embodiment of the invention.

As compared with the first embodiment illustrated in FIG. 3, the second embodiment does not include the first circumferential groove portion between the auxiliary bearing portion 31 and the first radial bearing portion 22a, and instead the auxiliary bearing portion 31 and the first radial bearing portion 22a are connected directly to each other. In addition, according to the second embodiment, at the boundary between the auxiliary bearing portion 31 and the first radial bearing portion 22a, the pitch s of the spiral auxiliary grooves of the auxiliary bearing portion 31 and the pitch t of the herringbone radial dynamic pressure grooves of the first radial bearing portion 22a satisfy the following relationship: t=n*s (n is an integer equal to or larger than 1).

With this configuration, a smaller increment in pressure is required to eliminate a negative pressure in the radial bearing portion 22a because the maximum pressure point of the auxiliary bearing portion 31 and the minimum pressure point of the first radial bearing portion 22a becomes closer in comparison with the first embodiment. Thus, the axial length of the auxiliary bearing portion 31 can be minimized in the second embodiment. The rest of configurations and corresponding advantages of the second embodiment are the same as those described in the first embodiment. Therefore, the duplicate description will be omitted.

Third Embodiment

Figure 8:
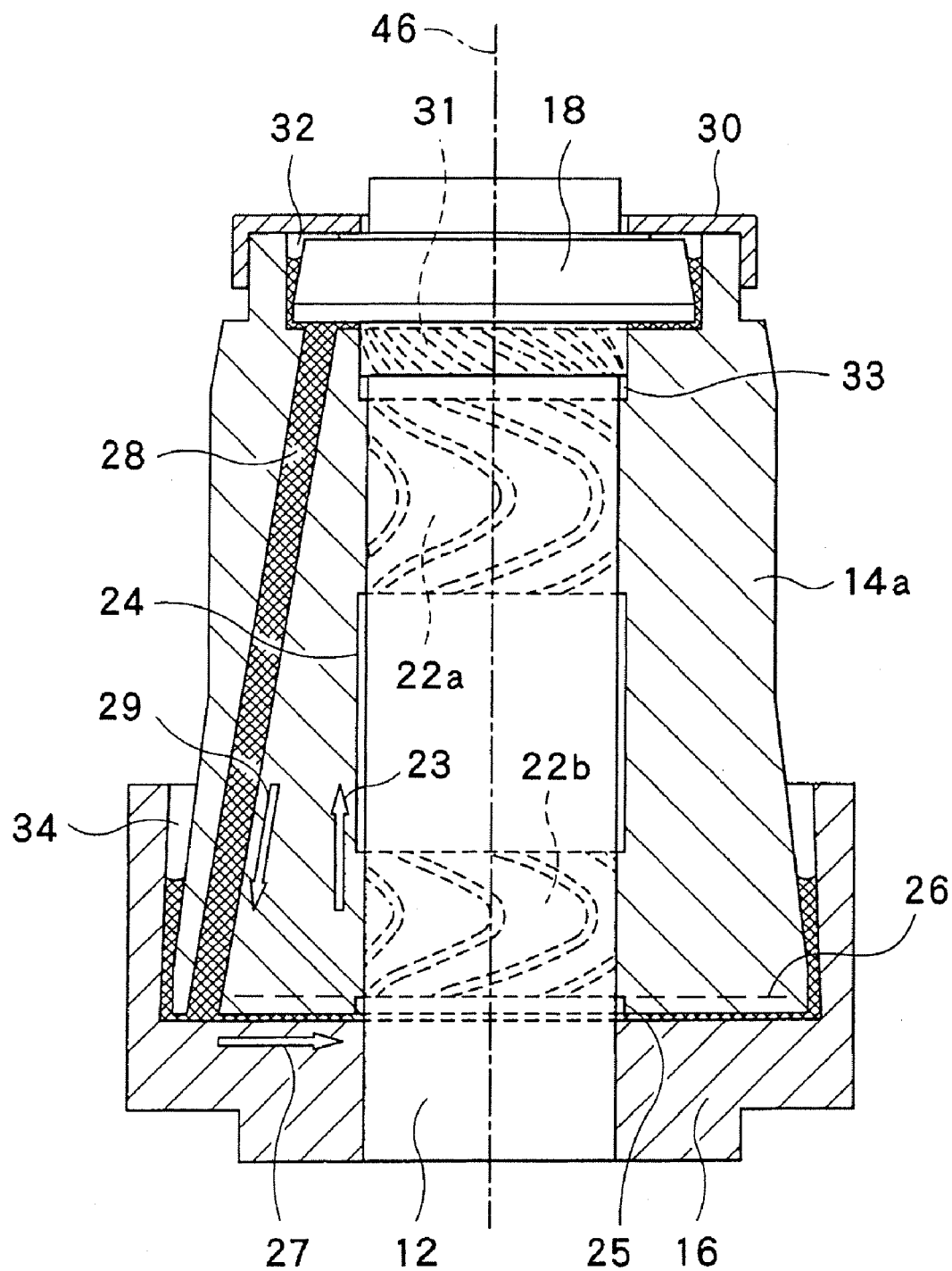
FIG. 8 is a longitudinal cross-sectional view illustrating a fluid dynamic bearing according to a third embodiment of the invention.

A fluid dynamic bearing according to the third embodiment of the invention, is described below. FIG. 8 illustrates a longitudinal cross-sectional structure of a relevant part according to the third embodiment of the invention.

As compared with the first embodiment illustrated in FIG. 3, the third embodiment differs therefrom in that the inner diameter of the sleeve 14a in the auxiliary bearing portion 31 is made larger, and that thus, the outer diameter of the stationary shaft 12 in the auxiliary bearing portion 31 is increased to set an appropriate gap size in the auxiliary bearing portion 31. The rest of configurations and corresponding advantages of the third embodiment are the same as those described in the first embodiment. Therefore, the duplicate description will be omitted.

Fourth Embodiment

Figure 9:
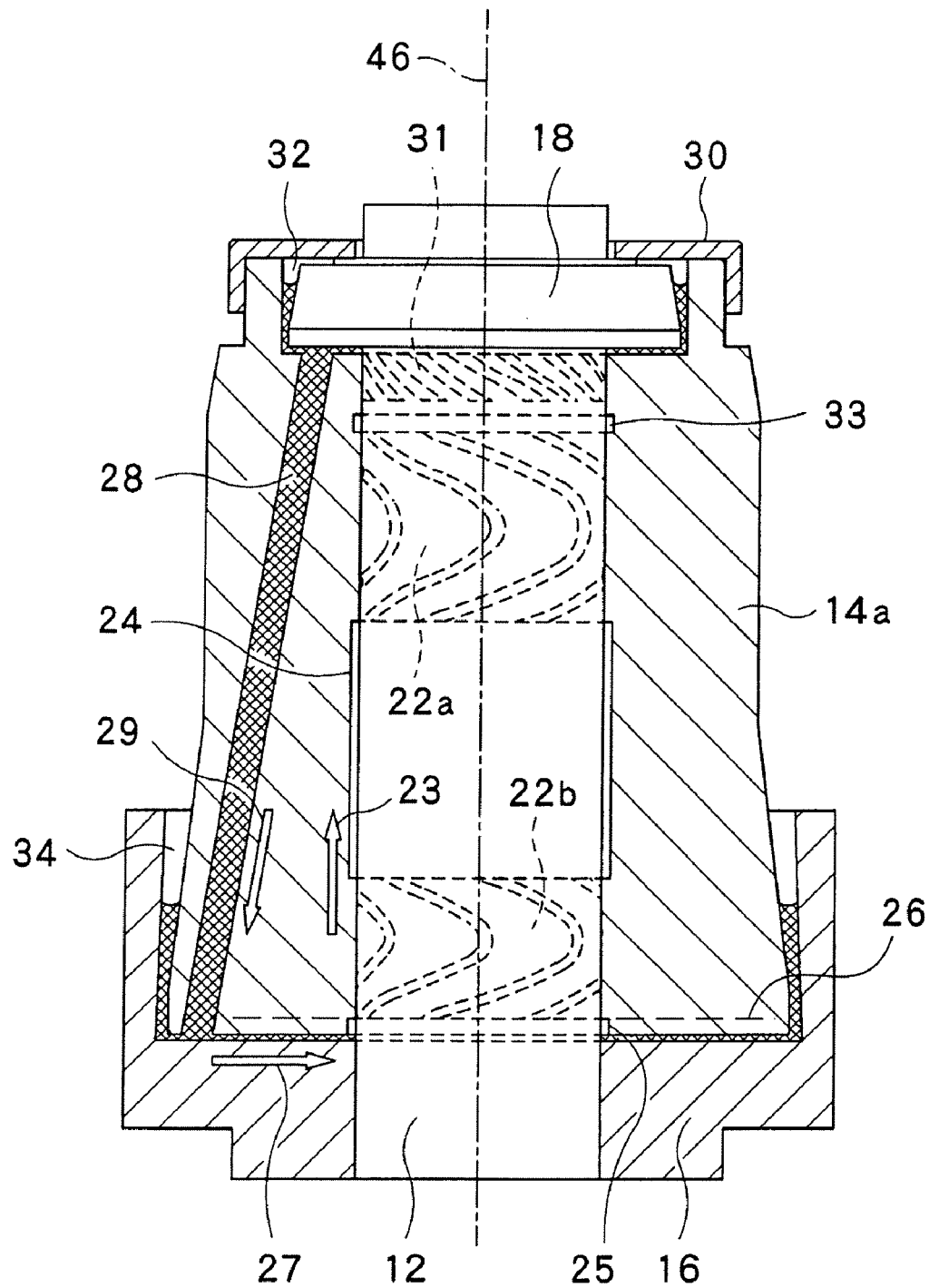
FIG. 9 is a longitudinal cross-sectional view illustrating a fluid dynamic bearing according to a fourth embodiment of the invention.

A fluid dynamic bearing according to the fourth embodiment of the invention is described below. FIG. 9 illustrates a longitudinal cross-sectional structure of a relevant part according to the fourth embodiment of the invention.

As compared with the first embodiment illustrated in FIG. 3, the fourth embodiment differs therefrom in that the bottom end of each spiral auxiliary groove of the auxiliary groove portion 31, i.e., the groove end of each spiral auxiliary groove located close to the first circumferential groove portion 33, is not connected to the first circumferential groove portion 33.

The feature of the fourth embodiment can be similarly applied to the third embodiment by not connecting the bottom end of each spiral auxiliary groove of the auxiliary bearing portion 31 to the wide gap area at the first circumferential groove 33 in the third embodiment. In the case of the fourth embodiment illustrated in FIG. 9, the inner diameter of the auxiliary bearing portion 31 of the sleeve 14a is equal to that of the first radial bearing portion 22a.

According to the fourth embodiment, the auxiliary bearing portion 31 is provided. Thus, although the fourth embodiment has a structure in which the bottom end of each spiral auxiliary groove is not connected to the first circumferential groove portion 33, the pressure in the first circumferential groove portion 33 is increased. Consequently, the generation of a negative pressure in the vicinity of the top end of the radial dynamic pressure groove of the first radial bearing portion 22a is prevented. In addition, because the depth of the spiral auxiliary groove is shallower than that of the radial dynamic pressure groove of the first radial bearing portion 22a, and because the gap size in the auxiliary bearing portion 31 is equal to or larger than that in the first radial bearing portion 22a, the fourth embodiment can increase the internal pressure in the gaps through the entire bearing device by the effects of raising the pressure of the lubricating fluid in the spiral auxiliary groove in a direction from the flange portion to the radial bearing portion. Additionally, the fourth embodiment can prevent the generation of a negative pressure in the vicinity of the top end of the spiral dynamic pressure groove.

The rest of configurations and corresponding advantages of the fourth embodiment are the same as those described in the first embodiment. Therefore, the duplicated description will be omitted.

As described with reference to the embodiments, there are provided a fluid dynamic bearing, a spindle motor having the fluid dynamic bearing, and a storage apparatus having the spindle motor, in which an auxiliary bearing portion is provided for preventing the generation of a negative pressure in an end part of a first radial dynamic pressure groove of a first radial bearing portion. In addition, the possibility of the generation of a negative pressure in an end part of an auxiliary groove itself of the auxiliary bearing portion can be reduced, because of the facts that the auxiliary groove is less in depth than the radial dynamic pressure groove of the first radial bearing portion, and that the auxiliary bearing portion is equal to or more in the gap size than the first radial bearing portion. Consequently, the generation of a negative pressure can be suppressed in the entire bearing.

Although the embodiments according to the present invention have been described above, the present invention is not limited to the above-mentioned embodiments. Additional advantages and modifications will readily occur to those skilled in the art without departing from the spirit and scope of the general inventive concept as defined by the appended claims.

What is claimed is:

1. A fluid dynamic bearing comprising:
    a stationary shaft that comprises: a first end portion being relatively fixed to a base plate;
    a second end portion being provided with a flange portion;
    a first radial bearing surface being defined on an outer circumferential surface of the stationary shaft;
    a radial bearing member that comprises: a second radial bearing surface that faces the first radial bearing surface to have a first gap therebetween; a first thrust bearing surface being defined on a first end portion of the radial bearing member; and a communication hole that connects a second gap with a third gap formed between a second end portion of the radial bearing member and one end surface of the flange portion, the radial bearing member being supported rotatably with respect to the stationary shaft;
    a thrust bearing member that is relatively fixed to the base plate and comprising a second thrust bearing surface that faces the first thrust bearing surface to have the second gap therebetween, the second gap communicating with the first gap;
    a lubricating fluid that fills continuously the first gap, the second gap, the third gap and the communication hole;
    a radial bearing portion that comprises a radial dynamic pressure groove that is formed on one of the first radial bearing surface and the second radial bearing surface;
    a thrust bearing portion that comprises a thrust dynamic pressure groove that is formed on one of the first thrust bearing surface and the second thrust bearing surface; and
    an auxiliary bearing portion that comprises an auxiliary groove for raising pressure of the lubricating fluid in a direction from the flange portion toward the radial bearing portion, the auxiliary groove being formed on one of the first radial bearing surface and the second radial bearing surface at a position between the flange portion and the radial bearing portion, wherein the auxiliary groove is shallower in depth than the radial dynamic pressure groove, and
wherein a size of the first gap in the auxiliary bearing portion is equal to or larger than
a size of the first gap in the radial bearing portion.

2. The fluid dynamic bearing according to claim 1,
wherein the radial bearing portion comprises:
a first radial bearing portion that is arranged close to the auxiliary bearing portion; and
a second radial bearing portion that is separated axially from the first radial bearing portion.

3. The fluid dynamic bearing according to claim 1,
wherein the radial dynamic groove is formed to have a half-sinewave shape or a herringbone shape, and
wherein the auxiliary groove comprises a spiral shape.

4. The fluid dynamic bearing according to claim 1,
wherein the auxiliary groove comprises an end portion being connected to the third gap.

5. The fluid dynamic bearing according to claim 1,
wherein an inner diameter of the radial bearing member at the auxiliary bearing portion is set to be equal to or larger than the inner diameter at the radial bearing portion.

6. The fluid dynamic bearing according to claim 1 further comprising:
a circumferential groove provided between the auxiliary bearing portion and the radial bearing portion, the circumferential groove having a depth set to be equal or deeper than the depth of the radial dynamic pressure groove.

7. The fluid dynamic bearing according to claim 6,
wherein the circumferential groove is connected to at least one of an end portion of the auxiliary groove and an end portion of the radial dynamic pressure groove.

8. The fluid dynamic bearing according to claim 1,
wherein the auxiliary bearing portion and the first radial bearing portion are provided continuously, and
a pitch s of the auxiliary grooves and a pitch t of the radial dynamic pressure grooves satisfy the following relationship:
$t = n*s$
where n is an integer equal to or larger than 1.

9. A spindle motor comprising:
the fluid dynamic bearing according to claim 1; and
a motor device that rotates a rotor portion comprising the radial bearing member.

10. A storage apparatus comprising:
the spindle motor according to claim 9; and
a recording disk mounted on the rotor portion to be rotated by the motor device of the spindle motor.

* * * * *